F. BOYLSTON.

Child's Carriage.

No. 82,683.

Patented Oct. 6, 1868.

Witnesses.

Inventor,
F. Boylston
per Murphy
Attorneys

United States Patent Office.

FRANCIS BOYLSTON, OF NEW YORK, N. Y.

Letters Patent No. 82,683, dated October 6, 1868.

---

IMPROVEMENT IN CHILDREN'S CARRIAGE.

---

*The Schedule referred to in these Letters Patent and making part of the same.*

---

TO ALL WHOM IT MAY CONCERN:

Be it known that I, FRANCIS BOYLSTON, of New York, in the county of New York, and State of New York, have invented a new and useful Improvement in Children's Carriages; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
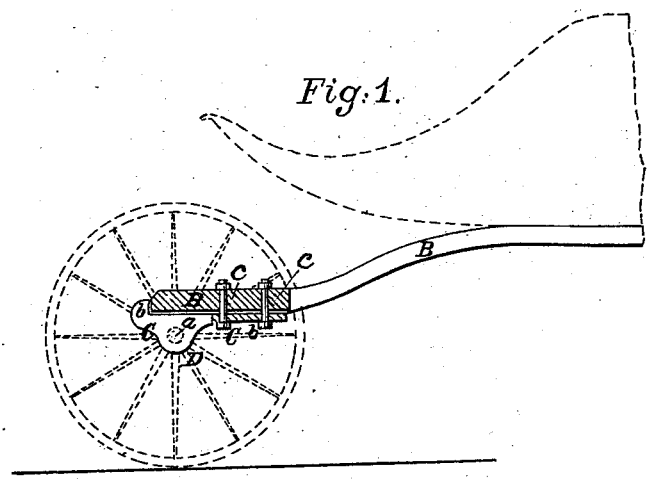
Figure 1 represents a side elevation, partly in section, of my invention.

This invention relates to a new manner of hanging the wheels on the front axles of that class of children's carriages which are known under the denomination of "perambulators," and consists in supporting the front axle, and retaining the wheels on the said front axle, by means of brackets which are screwed firmly to the ends of the axle.

A, in the drawing, represents the front axle of a children's carriage. On its ends are formed male screws, $a\ a$, as shown.

B B are the sills or side-bars of the carriage-frame.

C C are brackets, with a female thread, so that they can be screwed upon the respective ends of the axle. The brackets are provided with arms, $b\ b$, which form supports for the ends of the sills, and by means of screws, $c\ c$, or their equivalents, the nuts can be fastened to the sills.

Figure 2:
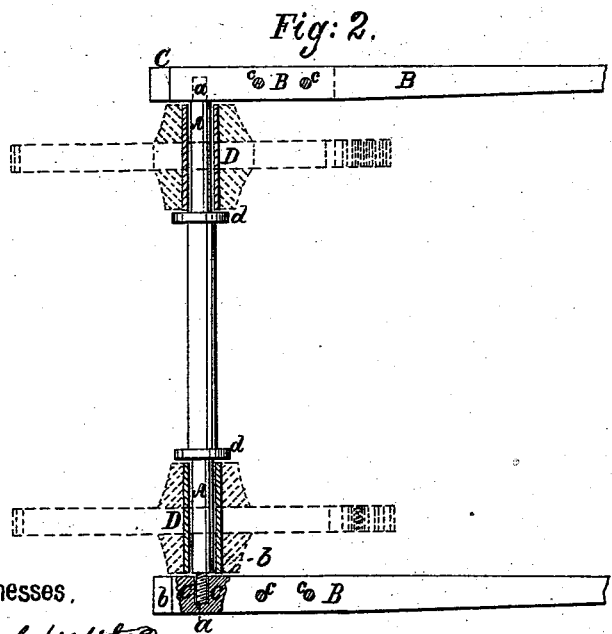
Figure 2 is a plane or top view, partly in section, of the same.

D D are the hubs of the wheels that are hung on the axle A, between the sills, said hubs turning loose around the fixed axle A. Each of these hubs is held between a flange, $d$, on the axle, and a bracket, as is clearly shown in fig. 2, or is otherwise held between the sills.

The hubs or wheels are put on before the brackets are attached to the axle, and when the brackets are secured to the axle they are, or may be, fastened to the sills, and are then securely held on the axle, and cannot turn or become detached by the jarring motion of the vehicle.

I am aware of the patent granted to Andrew Christian, April 24, 1866, but I claim nothing therein shown as my invention.

Having thus described my invention, what I claim as new, and desire to secure by Letters Patent, is—

The brackets C C, having extensions, $b\ b$, bolted to the ends of the sills B, and provided with an internal screw-thread, into which the ends of the front axle are firmly screwed, as herein set forth for the purpose specified.

The above specification of my invention signed by me, this tenth day of April, 1868.

FRANCIS BOYLSTON.

Witnesses:
WM. F. MCNAMARA,
ALEX. F. ROBERTS.